United States Patent Office 3,309,333
Patented Mar. 14, 1967

3,309,333
N,N-DISUBSTITUTED AMIDES AND THEIR USE AS PLASTICIZERS IN VINYL CHLORIDE RESINS
Robert R. Mod, Frank C. Magne, and Evald L. Skau, New Orleans, La., assignors to the United States of America as represented by the Secretary of Agriculture
No Drawing. Filed Aug. 26, 1964, Ser. No. 392,354
18 Claims. (Cl. 260—32.6)

A nonexclusive, irrevocable, royalty-free license in the invention herein described, throughout the world for all purposes of the United States Government, with the power to grant sublicenses for such purposes, is hereby granted to the Government of the United States of America.

This invention relates to N,N-disubstituted amides. More specifically, it relates to N,N-disubstituted amides useful as primary plasticizers for hydrophobic and hydrophilic resins. Still more specifically, it relates to vinyl-type resin compositions comprising the N,N-disubstituted amide plasticizers. These plasticizers are characterized by their great efficiency as compatible plasticizers for polyvinyl chloride polymers and copolymers imparting desirable low temperature properties and low volatility loss to the plasticized resin.

A primary object of the present invention is to provide for vinyl-type hydrophobic resins a group of primary plasticizers that are highly compatible with and do not exude from these resins.

Another object is to employ as these plasticizers certain novel N,N-disubstituted amides. Still another object is to prepare these N,N-disubstituted amides from commercially-available chemicals using commercially available equipment. A still further object is to provide a plasticized vinyl-type polymer or copolymer comprising these plasticizers. These and other objects will be discussed more fully below.

The N,N-disubstituted amides may be represented by the formula

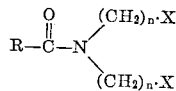

wherein
(a)

is an acyl group having from 8 to 22 carbon atoms and may be saturated, unsaturated, normal, branched, epoxy, aliphatic, cyclic, alicyclic, naphthenic, terpenic, terpene-derived, and mixtures thereof,
(b) $n$ is an integer equal to at least one but less than five, that is, from 1 to 4 inclusive, and
(c) X is a member selected from the group consisting of —OR′, —CN, —O(CH$_2$)$_m$CN, —O(CH$_2$)$_m$COOR′, wherein R′ is an alkyl group containing from one to eight carbon atoms, and $m$ is an integer from 1 to 2 inclusive.

Among the operable N,N-disubstituted amides of this invention are compounds of the above general formula in which the acyl group

is an acyl such as the acyls of the following types of acids: monobasic and dibasic normal or branched chain alkanoic and alkenoic acids with substituents in the chain such as; dichlorostearic acid; mono- or dihydroxystearic acids; acyloxy acids such as 12-acetoxyoleic, 12-acetoxystearic, 9,10-diacetoxystearic, and acylated ricinoleic acids and the like; 12-beta-cyanoethoxyoleic and 12-cyanoethoxystearic acids and the like; ricinoleic acid; phenylstearic acid; phenoxystearic acid; mono-, di-, or tri-epoxy stearic acids; mono- or diepoxy oleic acid; epoxydocosanoic acid; dimerized or trimerized linolenic, linoleic, or oleic acid; etc.; cyclic or alicyclic acids such as cyclized linoleic and/or linolenic acids; Diels-Alder adducts of such individual or mixed polyenoic acids as can be derived from tung oil acids or soybean acids; the Diels-Alder adducts of individual or mixed tung oil acids with di-alkyl maleates, alkyl acrylates, acrylonitrile, fumaronitrile and the like; tall oil acids; rosin-derived or terpene-derived acids such as abietic, 1-pimaric, pinonic and the gamma-lactone of beta-hydroxyisopropyl pimelic acid; as well as the mono-alkyl esters of dibasic acids such as the monobutyl esters of pinic, adipic, sebacic, azelaic, brassylic, carboxystearic, phthalic, and terephthalic acids, or of phosphonated fatty acids such as dialkyl phosphonostearic acid, and the like.

Also included among the operable N-acyl compounds of this invention are the corresponding N,N-disubstituted amides of normal, branched, aliphatic, alicyclic, or aromatic dibasic acids such as adipic, sebacic, azelaic, brassylic, carboxystearic, dimer, trimer, pinic, phthalic, and terephthalic acids. Other useful binary, ternary or multiple component mixtures of amides of saturated, monosaturated, and polyunsaturated acids are the N,N-disubstituted amides of synthetic mixtures of fatty acids which can be obtained from such natural sources as white greases, menhaden oil, jojoba oil, parsley seed oil, rapeseed oil, crambe seed oil, cottonseed oil, soybean oil, *Limnanthes douglasii* seed oil, palm oil, *Vernonia anthelmintica* seed oil, castor oil, and other seed oils; or from foots, tall-oil acids or rosin acids.

As used herein, the term "dimer acid" or "dimerized acid" relates to acids or mixtures of acids consisting essentially of dibasic acids containing from 32 to 44 carbon atoms resulting from polymerization or dimerization of long chain C$_{16}$ to C$_{22}$ unsaturated fatty acids. The term "trimer acid," or "trimerized acids" ratles to acids or mixtures of acids consisting essentially of tribasic acids containing from 48 to 66 carbon atoms resulting from the polymerization or trimerization of long chain C$_{16}$ to C$_{22}$ unsaturated fatty acids. These products are commercially available.

Specific examples of the N,N-disubstituted amides described above are:

N,N-bis(2-methoxyethyl)oleamide
N,N-bis(2-ethoxyethyl)oleamide
N,N-bis(2-ethoxyethyl)palmitamide
N,N-bis(2-ethoxyethyl)2-ethylhexanamide
N,N-bis(2-ethoxyethyl)naphthenamide
Ethyl 2,2-dimethyl-3[di(2-methoxyethyl)amino]carbonylcyclobutaneacetate
N,N-bis(2-methoxyethyl)amide of hydrogenated cottonseed oil fatty acids
N,N-bis(2-ethoxyethyl)amide of animal acids
N,N-bis(2-cyanoethyl)oleamide
N,N-bis(2-ethoxyethyl)decanamide
N,N-bis(2-ethoxyethyl)stearamide
N,N-bis(2-ethoxyethyl)erucamide
N,N-bis(2-ethoxyethyl)amide of *Limnanthes douglasii* oil fatty acids
N,N-N′,N′-tetra(2-ethoxyethyl)amide of dimer acid
N,N-bis(2-methoxyethyl)amide of parsley seed oil fatty acids
N,N-bis(2-methoxyethyl)amide of rapeseed oil fatty acids
N,N-bis(2-methoxyethyl)linoleamide
N,N-bis(2-ethoxyethyl)epoxystearamide
N,N-bis(2-cyanoethoxyethyl)oleamide
N,N-bis(carbethoxymethyl)oleamide It is an advantage of our invention that the N,N-disubstituted amides are excellent primary, solvent-type plasticizers for vinyl-type resins. As used herein, the term "primary, solvent-type plasticizer" relates to a compound which is compatible when used alone. The term "vinyl-type resin" includes the hydrophobic polymers and copolymers of monomers containing vinyl chloride in major proportions by weight.

It is a further advantage of our invention that the N,N-disubstituted amides are compatible, solvent-type plasticizers for the vinyl-type resins. As used herein, the terms "compatible," "good compatibility," and "compatible plasticizers" refer to plasticizers which show no sign of exudation or migration to the surface for at least two weeks during shelf storage, when the plasticizers are present in the hydrophobic resin in proportions of about 70 parts of plasticizer per 100 parts of resin, parts being by weight. When a resin is plasticized with a compound with which it has only limited compatibility, the plasticizer soon exudes or migrates to the surface unless the plasticizer is used either in a limited amount or is used in conjunction with a mutual solvent (a compatible auxiliary plasticizer) to obtain adequate compatibility.

It is a still further advantage of this invention that the efficient, primary, solvent-type plasticizers may be made from commercially-available, low-price fatty acids using commercially-available equipment. Most important these novel plasticizers for vinyl-type resins are characterized by excellent low-temperature properties, i.e., they prevent the resin composition from becoming brittle or from cracking at sub-zero centigrade temperatures.

These N,N-disubstituted amides may also be used as softeners for nitrile rubber, e.g. Hycar 1042 (33% acrylonitrile).

These and other advantages will be apparent to those skilled in the art.

The compounds that are the subject of this invention are conveniently prepared by reacting the appropriate amine with the appropriate acid, or corresponding acid chloride. In any event, methods for preparing compounds such as those described herein are well known to those skilled in the art of fatty acid chemistry. The details of individual preparations are listed in the following operating examples. These examples are set forth by way of illustration and it will be understood that the invention is not to be construed as limited to these compounds or by the details therein. Analyses are in weight percent.

EXAMPLE 1

*N,N-bis(2-methoxyethyl)oleamide.*—A mixture of 31.2 grams (0.23 mole) of di(2-methoxyethyl)amine, 40 grams (0.14 mole) of oleic acid, and 20 milliliters of benzene is refluxed in an apparatus equipped with a Dean-Stark trap until the evolution of water ceases. The reaction mixture is diluted with 150 milliliters of commercial hexane, washed successively with dilute hydrochloric acid and water, and dried over anhydrous sodium sulfate. Free acid is removed by percolating the hexane solution through a column of activated alumina, and eluting the amide with a 1:1 hexane-ethanol mixture. The solvent is removed by stripping under reduced pressure. Analysis of the product, N,N-bis(2-methoxylethyl)oleamide: percent C, 72.18 (theory 72.43); percent H, 11.75 (theory 11.92); percent N, 3.53 (theory 3.52).

EXAMPLE 2

*N,N - bis(2 - ethoxyethyl)palmitamide.*—N,N - bis(2-ethoxyethyl)palmitamide is prepared by the procedure of Example 1 from 30.2 grams (0.19 mole) of di(2-ethoxyethyl)amine and 40 grams (0.16 mole) palmitic acid. Analysis of the product, N,N-bis(2-ethoxyethyl)palmitamide: percent C, 71.89 (theory 70.34); percent H, 12.43 (theory 12.06); percent N, 3.50 (theory 3.51).

EXAMPLE 3

*N,N - bis(2 - ethoxyethyl)oleamide.*—N,N-bis(2-ethoxyethyl)oleamide is prepared by the procedure of Example 1 from 33.8 grams (0.21 mole) of di(2-ethoxyethyl)amine and 40 grams (0.14 mole) of oleic acid. Analysis of the product, N,N-bis(2-ethoxyethyl)oleamide: percent C, 73.37 (theory 73.31); percent H, 11.75 (theory 11.92); percent N, 3.53 (theory 3.52).

EXAMPLE 4

*N,N - bis(2 - ethoxyethyl)2 - ethylhexanamide.*—This product is prepared using 30.2 gr. (0.20 mole) of di(2-ethoxyethyl)amine, 15.8 grams (0.20 mole) of pyridine dissolved in 100 milliliters of benzene, and 30.5 grams (0.20 mole) of 2-ethylhexanoyl chloride which is added dropwise with stirring. After stirring for an additional hour the reaction mixture is filtered, washed successively with dilute hydrochloric acid and water, and dried over anhydrous sodium sulfate. Free acid is removed by percolating the benzene solution through a column of activated alumina and eluting the amide with a 1:1 ethanol-benzene mixture. The solvent is then removed by stripping under reduced pressure. Analysis of the product, N,N - bis(2 - ethoxyethyl)2-ethylhexanamide: percent C, 66.26 (theory 66.85); percent H, 11.65 (theory 11.56); percent N, 4.88 (theory 4.80).

EXAMPLE 5

*N,N - bis(2 - ethoxyethyl)naphthenamide.*—N,N-bis(2-ethoxyethyl)naphthenamide is prepared by the procedure of Example 1 from 29.3 grams (0.18 mole) of di(2-ethoxyethyl)amine and 30 grams (0.14 mole) of naphthenic acid. The neutralization equivalent of the naphthenic acid is 217. The product, N,N-bis(2-ethoxyethyl)naphthenamide, has a nitrogen content of 3.90% (theory 3.89).

EXAMPLE 6

*Ethyl 2,2 dimethyl-3[di(2-methoxyethyl)amino]carbonylcyclobutaneacetate.*—This material is prepared by the procedure of Example 4 from 17.2 grams (0.13 mole) of di(2-methoxyethyl)amine, 30 grams (0.13 mole) of ethyl 2,2 - dimethyl-3-chlorocarbonylcyclobutaneacetate, and 10.2 grams (0.13 mole) of pyridine. Analysis of the product, ethyl 2,2-dimethyl-3[di(2-methoxyethyl)amino]carbonylcyclobutaneacetate: percent C, 61.15 (theory 62.01); percent H, 9.56 (theory 9.50); percent N, 4.09 (theory 4.25).

EXAMPLE 7

*N,N-bis(2-methoxyethyl)amide of selectively hydrogenated cottonseed oil fatty acids.*—N,N-bis(2-methoxyethyl)amide of selectively hydrogenated cottonseed oil fatty acids are prepared by the procedure of Example 1 from 25.5 grams (0.19 mole) of di(2-methoxyethyl)amine and 35 grams (0.12 mole) of selectively hydrogenated cottonseed oil fatty acids. (The selectively hydrogenated cottonseed oil fatty acids have an iodine value of 73.2, a thiocyanogen value of 68.0, and a neutralization equivalent of 274.) The product, N,N-bis(2-methoxyethyl) amide of selectively hydrogenated cottonseed oil fatty acids, has a nitrogen content of 3.63%.

EXAMPLE 8

*N,N-bis(2-ethoxyethyl)amide of animal acids.*—N,N-bis(2-ethoxyethyl)amide of "animal acids" (Neofat No. 65) is prepared by the procedure of Example 1 from 43.9 grams (0.27 mole) of di(2-ethoxyethyl)amine and 50 grams (0.19 mole) of Neofat No. 65, a commercial product which is a mixture of fatty acids having the following composition: 2% myristic, 26% palmitic, 16% stearic, 48% oleic, and 8% linoleic acids. The resulting product, N,N-bis(2-ethoxyethyl)amide of animal acids, has a nitrogen content of 3.33% (theory 3.36).

EXAMPLE 9

*N,N - bis(carbethoxymethyl)oleamide.*—N,N - bis(carbethoxymethyl)oleamide is prepared by the procedure of Example 4 from 18.9 grams (0.10 mole) of di(carbethoxymethyl)amine, 31.5 grams (0.10 mole) of oleoyl chloride, and 8.1 grams (0.10 mole) of pyridine. The product, N,N-bis(carbethoxymethyl)oleamide has a nitrogen content of 2.97% (theory 3.09).

EXAMPLE 10

*N,N - bis(ethoxyethyl)decanamide.*—N,N - bis(2-ethoxyethyl)decanamide is prepared by the procedure of Example 1 from 47.1 grams (0.29 mole) of di(2-ethoxyethyl)amine and 35 grams (0.20 mole) of capric acid. Analysis of the product, N,N-bis(2-ethoxyethyl)decanamide: percent C, 67.97 (theory 68.51); percent H, 11.66 (theory 11.83); percent N, 4.42 (theory 4.44).

EXAMPLE 11

*N,N - bis(2 - ethoxyethyl)stearamide.*—N,N - bis(2-ethoxyethyl)stearamide is prepared by the procedure of Example 1 from 29.7 grams (0.18 mole) of di(2-ethoxyethyl)amine and 35 grams (0.12 mole) of stearic acid. Analysis of the product, N,N-bis(2-ethoxyethyl)stearamide: percent C, 72.88 (theory 72.93); percent H, 12.54 (theory 12.49); percent N, 3.32 (theory 3.27).

EXAMPLE 12

*N,N - bis(2 - ethoxyethyl)erucamide.*—N,N - bis(2-ethoxyethyl)erucamide is prepared by the procedure of Example 1 from 28.5 grams (0.18 mole) of di(2-ethoxyethyl)amine and 40 grams (0.12 mole) of erucic acid. Analysis of the product, N,N-bis(2-ethoxyethyl)erucamide: percent C, 74.45 (theory 74.75); percent H, 12.33 (theory 12.35); percent N, 2.87 (theory 2.91).

EXAMPLE 13

*N,N - bis(2-ethoxyethyl)amide of Limnanthes douglasii oil fatty acids.*—N,N - bis(2-ethoxyethyl)amide of *Limnanthes douglasii* oil fatty acids is prepared by the procedure of Example 1 from 26.4 grams (0.16 mole) of di(2-ethoxyethyl)amine and 35 grams (0.11 mole) of *Limnanthes douglasii* oil fatty acids. (The *Limnanthes douglasii* oil fatty acids has a neutralization equivalent of 320.) The product N,N-bis(2-ethoxyethyl)amide of *Limnanthes douglasii* oil fatty acids has a nitrogen content of 3.09%.

EXAMPLE 14

*N,N-N',N'-tetra(2-ethoxyethyl)amide of dimer acid.*—This material is prepared by the procedure of Example 1 from 30.1 grams (0.19 mole) of di(2-ethoxyethyl)amine and 35 grams (0.06 mole) of dimer acid. The resulting product has a nitrogen content of 2.91%.

EXAMPLE 15

*N,N-bis(2-methoxyethyl)amide of parsley seed oil fatty acids.*—N,N-bis(2-methoxyethyl)amide of parsley seed oil fatty acids is prepared by the procedure of Example 1 from 32.6 grams (0.25 mole) of di(2-methoxyethyl)amine and 50 grams (0.16 mole) of parsley seed oil fatty acids. The resulting product has a nitrogen content of 2.99% (theory 3.22).

EXAMPLE 16

*N,N-bis(2-methoxyethyl)amide of rapeseed oil fatty acids.*—This material is prepared by the procedure of Example 1 using 32.9 grams (0.25 mole) of di(2-methoxyethyl)amine and 50 grams (0.16 mole) of rapeseed oil fatty acids. The resulting product has a nitrogen content of 3.10% (theory 3.35).

EXAMPLE 17

*N,N - bis(2-methoxyethyl)linoleamide.*—This material is prepared by the procedure of Example 1 from 28.5 grams (0.21 mole) of di(2-methoxyethyl)amine and 40 grams (0.14 mole) of linoleic acid. Results of the analysis of the resulting product follows: percent C, 72.48 (theory 72.83); percent H, 11.43 (theory 11.38); percent N, 3.48 (theory 3.54).

EXAMPLE 18

*N,N - bis(2 - ethoxyethyl)epoxystearamide.*—N,N-bis-(2-ethoxyethyl)epoxystearamide is an epoxidized sample of the N,N-bis(2-ethoxyethyl)oleamide of Example 3, having an oxirane oxygen content of 3.33%.

EXAMPLE 19

*N,N - bis(2 - cyanoethyl)oleamide.*—N,N - bis(2-cyanoethyl)oleamide was prepared by the procedure of Example 4 from 14.3 grams (0.12 mole) of $\beta,\beta'$-iminodipropionitrile, 35 grams (0.12 mole) of oleoyl chloride, and 9.2 grams (0.12 mole) of pyridine. Analysis of the resulting product gives: percent C, 73.69 (theory 74.36); percent H, 10.63 (theory 10.66); percent N, 10.80 (theory 10.85).

EXAMPLE 20

*N,N - bis(2 - cyanoethoxyethyl)oleamide.*—Fifty grams (0.135 mole) of N,N-bis(2-hydroxyethyl)oleamide, and 5 ml. of Triton B (40% in methanol) in 5 ml. of water are dissolved in an equal volume of 1,4-dioxane. The temperature is then raised to 55° C. after which 29 grams (0.55 mole) of acrylonitrile is added dropwise with stirring. Stirring is then continued for about three hours after the acrylonitrile addition. While still warm the reaction mixture is poured into 800 milliliters of diethyl ether, and allowed to stand overnight. The polyacrylonitrile was then filtered off and the filtrate washed successively with four 50-ml. portions of normal hydrochloric acid in water, dried, and stripped of solvent. The residual activity is removed by percolation through activated alumina. The resultant product has a nitrogen content of 8.50% (theory 8.80%).

Portions of the product prepared according to Examples 1 through 20 are then evaluated as primary, solvent-type plasticizers for vinyl-type resins by the following procedures:

(1) Incorporating the plasticizer in a vinyl chloride-vinyl acetate copolymer (Vinylite VYDR) a copolymer consisting of 95% vinyl chloride and 5% vinyl acetate.

(2) Incorporating the plasticizer in a polyvinyl chloride resin (Geon 101).

In either method, the following standard formulation is used, percent being by weight.

|  | Percent |
|---|---|
| Polymer (or copolymer) | 63.5 |
| Plasticizer | 35.0 |
| Stearic acid | 0.5 |
| Basic lead carbonate | 1.0 |
| Total | 100.0 |

The formulation for each sample is then milled, molded, and then tested for: (a) tensile strength (p.s.i.); (b) 100% modulus (p.s.i.); (c) elongation (percent); (d) brittle point (° C.); (e) volatility loss in percent; and (f) compatibility.

The results of the above tests are then compared with control results obtained when a standard plasticizer such as di-2-ethylhexylphthalate (DOP) or dioctyladipate (DOA) is used. These results are summarized in Table I. "C" denotes compatibility and "I" denotes incompatibility as primary plasticizers in the proportions used.

TABLE I

| Example Number | Plasticizer | Tensile strength, p.s.i. | 100% modulus, p.s.i. | Elongation, percent | Brittle point °C. | Volatility loss, percent | Compatibility |
|---|---|---|---|---|---|---|---|
| 1 | N,N-bis(2-methoxyethyl)oleamide | 2,800 | 1,140 | 370 | −53 | 2.70 | C. |
| 2 | N,N-bis(2-ethoxyethyl)palmitamide | 2,860 | 1,390 | 360 | −43 | 1.21 | C. |
| 2a | N,N-bis(2-ethoxyethyl)palmitamide | 3,050 | 2,430 | 190 | −29 | 0.37 | C. |
| 3 | N,N-bis(2-ethoxyethyl)oleamide | 2,800 | 1,410 | 340 | −57 | 2.01 | C. |
| 4 | N,N-bis(2-ethoxyethyl)2-ethylhexanamide | 2,760 | 1,280 | 320 | −37 | 8.23 | C. |
| 5 | N,N-bis(2-ethoxyethyl)naphthenamide | 3,050 | 1,600 | 300 | −21 | 9.58 | C. |
| 6 | Ethyl 2,2-dimethyl-3[di(2-methoxyethyl)amino]carbonylcyclobutaneacetate | 3,300 | 1,510 | 310 | −7 | 7.55 | C. |
| 7 | N,N-bis(2-methoxyethyl)amide of selectively hydrogenated cottonseed oil fatty acids | 2,630 | 1,310 | 300 | −49 | 1.13 | C. |
| 8 | N,N-bis(2-ethoxyethyl)amide of animal acids | 2,790 | 1,440 | 340 | −47 | 1.40 | C. |
| 9 | N,N-bis(carbethoxymethyl)oleamide | 2,920 | 1,730 | 280 | −33 |  | C. |
| 10 | N,N-bis(2-ethoxyethyl)decanamide | 2,580 | 1,090 | 350 | −45 | 7.33 | C. |
| 11 | N,N-bis(2-ethoxyethyl)stearamide | 2,820 | 1,470 | 360 | −37 | 0.82 | C. |
| 12 | N,N-bis(2-ethoxyethyl)erucamide | 2,480 | 1,630 | 270 | −51 | 0.83 | C. |
| 13 | N,N-bis(2-ethoxyethyl)amide of *Limnanthes douglasii* oil fatty acids | 3,280 | 1,560 | 330 | −45 | 1.51 | C. |
| 14 | N,N-N',N'-tetra(2-ethoxyethyl)amide of dimer acid | 3,120 | 2,065 | 320 | −25 | 0.43 | C. |
| 15 | N,N-bis(2-methoxyethyl)amide of parsley seed oil fatty acids | 2,910 | 1,350 | 360 | −47 | 1.94 | C. |
| 16 | N,N-bis(2-methoxyethyl)amide of rapeseed oil fatty acids | 2,880 | 1,440 | 380 | −51 | 0.83 | C. |
| 17 | N,N-bis(2-methoxyethyl)linoleamide | 2,860 | 1,440 | 350 | −51 |  | I. |
| 18 | N,N-bis(2-ethoxyethyl)epoxystearamide | 2,730 | 1,130 | 360 | −33 | 0.60 | C. |
| 19 | N,N-bis(2-cyanoethyl)oleamide |  |  |  |  |  | I. |
| 20 | N,N-bis(2-cyanoethoxyethyl)oleamide | 3,440 | 2,390 | 310 | −37 |  | I. |
|  | Di-2-ethylhexylphthalate (control) | 3,050 | 1,610 | 330 | −33 | 1.50 | C. |
|  | Dioctyl adipate (control) | 2,890 | 1,290 | 380 | −55 | 6.00 | C. |

Above compounds tested in vinyl-chloride-vinyl acetate copolymer. Compound 2a tested in polyvinyl chloride.

We claim:

1. A plasticized vinyl chloride-type resin composition comprising at least one vinyl chloride-type resin selected from the group consisting of a polyvinyl chloride homopolymer and a vinyl chloride-vinyl acetate copolymer containing a major portion of vinyl chloride by weight, plasticized with a plasticizer consisting of a compound represented by the formula

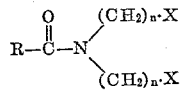

wherein
(a)

is an acyl group having from 8 to 22 carbon atoms and may be saturated, unsaturated, normal, branched, aliphatic, cyclic, alicyclic, epoxy, naphthenic, terpenic, terpene-derived, and mixtures thereof,
(b) $n$ is an integer from 1 to 4 inclusive, and
(c) X is a member selected from the group consisting of —OR', —CN, —O(CH$_2$)$_m$CN, and —O(CH$_2$)$_m$COOR' where R' is an alkyl group containing from one to eight carbon atoms and $m$ is an integer from 1 to 2 inclusive.

2. The vinyl chloride resin composition of claim 1 wherein the plasticizer is N,N-bis(2-methoxyethyl)oleamide.

3. The vinyl chloride resin composition of claim 1 wherein the plasticizer is N,N-bis(2-ethoxyethyl)palmitamide.

4. The vinyl chloride resin composition of claim 1 wherein the plasticizer is N,N-bis(2-ethoxyethyl)oleamide.

5. The vinyl chloride resin composition of claim 1 wherein the plasticizer is N,N-bis(2-ethoxyethyl)2-ethylhexanamide.

6. The vinyl chloride resin composition of claim 1 wherein the plasticizer is N,N-bis(2-ethoxyethyl)naphthenamide.

7. The vinyl chloride resin composition of claim 1 wherein the plasticizer is ethyl 2,2-dimethyl-3[di(2-methoxyethyl)amino]cabonylcyclobutaneacetate.

8. The vinyl chloride resin composition of claim 1 wherein the plasticizer is N,N-bis(2-methoxyethyl)amide of selectively hydrogenated cottonseed oil fatty acids.

9. The vinyl chloride resin composition of claim 1 wherein the plasticizer is N,N-bis(2-ethoxyethyl)amide of animal acids.

10. The vinyl chloride resin composition of claim 1 wherein the plasticizer is N,N-bis(carbethoxymethyl)oleamide.

11. The vinyl chloride resin composition of claim 1 wherein the plasticizer is N,N-bis(2-ethoxyethyl)decanamide.

12. The vinyl chloride resin composition of claim 1 wherein the plasticizer is N,N-bis(2-ethoxyethyl)stearamide.

13. The vinyl chloride resin composition of claim 1 wherein the plasticizer is N,N-bis(2-ethoxyethyl)erucamide.

14. The vinyl chloride resin composition of claim 1 wherein the plasticizer is N,N-bis(2-ethoxyethyl)amide of *Limnanthese douglasii* oil fatty acids.

15. The vinyl chloride resin composition of claim 1 wherein the plasticizer is N,N-N',N'-tetra(2-ethoxyethyl)amide of dimer acid.

16. The vinyl chloride resin composition of claim 1 wherein the plasticizer is N,N-bis(2-methoxyethyl)amide of parsley seed oil fatty acids.

17. The vinyl chloride resin composition of claim 1 wherein the plasticizer is N,N-bis(2-methoxyethyl)amide of rapeseed oil fatty acids.

18. The vinyl chloride resin composition of claim 1 wherein the plasticizer is N,N-bis(2-ethoxyethyl)epoxystearamide.

References Cited by the Examiner

UNITED STATES PATENTS

| 2,373,299 | 4/1945 | De Groote et al. | 260—404 |
| 2,472,900 | 6/1949 | Johnston et al. | 260—32.6 |
| 2,472,901 | 6/1949 | Johnston et al. | 260—32.6 |
| 3,179,615 | 4/1965 | Magne et al. | 260—32.6 |

MORRIS LIEBMAN, *Primary Examiner.*

L. T. JACOBS, *Assistant Examiner.*